United States Patent
Lin et al.

(10) Patent No.: US 11,481,875 B2
(45) Date of Patent: Oct. 25, 2022

(54) METHOD AND ELECTRONIC DEVICE FOR PROCESSING IMAGES THAT CAN BE PLAYED ON A VIRTUAL DEVICE BY USING A SUPER-RESOLUTION DEEP LEARNING NETWORK MODEL

(71) Applicant: Acer Incorporated, New Taipei (TW)

(72) Inventors: Shih-Hao Lin, New Taipei (TW); Chao-Kuang Yang, New Taipei (TW); Wen-Cheng Hsu, New Taipei (TW); Liang-Chi Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/249,671

(22) Filed: Mar. 9, 2021

(65) Prior Publication Data

US 2021/0374908 A1 Dec. 2, 2021

(30) Foreign Application Priority Data

Jun. 1, 2020 (TW) .................. 109118257

(51) Int. Cl.
*G09G 5/391* (2006.01)
*G06T 3/40* (2006.01)
*G06N 20/00* (2019.01)

(52) U.S. Cl.
CPC ........... *G06T 3/4053* (2013.01); *G06N 20/00* (2019.01); *G06T 3/4046* (2013.01); *G09G 5/391* (2013.01); *G09G 2340/0407* (2013.01)

(58) Field of Classification Search
None
See application file for complete search history.

(56) References Cited

U.S. PATENT DOCUMENTS 10,733,714 B2 8/2020 El-Khamy et al.
10,877,540 B2 * 12/2020 Belagal Math ....... G06F 1/3218
(Continued)

FOREIGN PATENT DOCUMENTS

KR 10-2019-0053074 A 5/2019
TW 201837854 A 10/2018
TW 201926989 A 7/2019

OTHER PUBLICATIONS

Wafaa Ahmed, "The Impact of Filter Size and No. of Filters on Classification Accuracy in CNN," Apr. 2020, 2020 International Conference on CSASE, p. 88-93. (Year: 2020).*

(Continued)

*Primary Examiner* — Joni Hsu
(74) *Attorney, Agent, or Firm* — McClure, Qualey & Rodack, LLP

(57) ABSTRACT

A method for processing an image that can be played on a virtual device, including obtaining a super-resolution deep learning network model, which is trained to learn to reconstruct an image from low resolution to high resolution; wherein the super-resolution deep learning network model includes a plurality of feature filters to extract features of the image; modifying the resolution of the feature filters from a preset value to an established value, wherein the established value is higher than the preset value; inputting a low-resolution image into the super-resolution deep learning network model; and increasing the resolution of the low-resolution image to become a high-resolution image through the super-resolution deep learning network model.

12 Claims, 2 Drawing Sheets

(56) References Cited

U.S. PATENT DOCUMENTS

| | | | |
|---|---|---|---|
| 10,970,820 | B2 | 4/2021 | El-Khamy et al. |
| 11,284,054 | B1* | 3/2022 | Miranda .............. H04N 13/122 |
| 2017/0347110 | A1* | 11/2017 | Wang ....................... G06N 3/04 |
| 2018/0075581 | A1* | 3/2018 | Shi ........................ G06T 3/4046 |
| 2019/0095795 | A1 | 3/2019 | Ren et al. |
| 2019/0188781 | A1* | 6/2019 | O'Brien ............. G06Q 30/0643 |
| 2020/0162789 | A1* | 5/2020 | Ma ................. H04N 21/440263 |
| 2020/0304827 | A1 | 9/2020 | Abe et al. |
| 2021/0076098 | A1* | 3/2021 | Espeland ........... H04N 21/6405 |
| 2021/0217387 | A1* | 7/2021 | Lim ....................... G09G 5/391 |

OTHER PUBLICATIONS

Chinese language office action dated Aug. 25, 2021, issued in application No. TW 109118257.

* cited by examiner

METHOD AND ELECTRONIC DEVICE FOR PROCESSING IMAGES THAT CAN BE PLAYED ON A VIRTUAL DEVICE BY USING A SUPER-RESOLUTION DEEP LEARNING NETWORK MODEL

CROSS REFERENCE TO RELATED APPLICATIONS

This application claims priority to and benefit of Taiwan Application No. 109118257, filed on Jun. 1, 2020, the entirety of which is incorporated by reference herein.

FIELD OF THE INVENTION

The invention relates to a method for processing images, especially one relating to a method and an electronic device for processing images that can be played on a virtual device.

DESCRIPTION OF THE RELATED ART

With existing technology, after outputting a video or image taken by a panoramic camera to a computer, although the resolution is high (for example, the resolution may be 4K or 6K), the video or image is in the form of equidistant rectangular projection, and it is difficult to browse on a flat screen. When using a virtual realty device to play these panoramic videos or panoramic images, since the panoramic moves or the panoramic images are played in "spherical" screen mode, their resolution may be divided by 4 (i.e., up, down, left and right), resulting in that the playback picture in the virtual reality device is blurred.

Currently, the application of the super-resolution deep learning network model in public is used to process normal images or videos (with a 90-degree field of view), and cannot process panoramic images or panoramic videos (with a 360-degree field of view).

BRIEF SUMMARY OF THE INVENTION

In order to resolve the issue described above, an embodiment of the invention provides a method for processing an image that can be played on a virtual reality (VR) device, including: obtaining a super-resolution deep learning network model, which is trained to learn to reconstruct an image from low resolution to high resolution; wherein the super-resolution deep learning network model includes a plurality of feature filters to extract features of the image; modifying the resolution of the feature filters from a preset value to an established value, wherein the established value is higher than the preset value; inputting a low-resolution image into the super-resolution deep learning network model; and increasing the resolution of the low-resolution image to become a high-resolution image through the super-resolution deep learning network model.

According to the method disclosed above, further including: decreasing the resolution of the high-resolution image to generate a medium-resolution image; and inputting the medium-resolution image into the virtual reality device for display.

According to the method disclosed above, the training of the super-resolution deep learning network model includes: selecting a training image from an image set; randomly cropping a first sampled image with a resolution of 384*384 pixels from the training image; decreasing the resolution of the first sampled image to 96*96 pixels to obtain a second sampled image; utilizing a resolution enhancement algorithm in the super-resolution deep learning network model to increase the resolution of the second sampled image back to 384*384 pixels to obtain a virtual image; comparing the virtual image with the first sampled image to calculate the degree of distortion of the virtual image relative to the first sampled image; repeatedly adjusting the feature weight of the resolution enhancement algorithm until the degree of distortion of the virtual image relative to the first sampled image is lower than a threshold; and selecting another training image from the image set and repeating the training.

According to the method disclosed above, the low-resolution image and the training image are images with a 360-degree field of view and 4K resolution, and the high-resolution image is an image with a 360-degree field of view and 16K resolution. The preset value is 3*3 pixels, and the established value is 5*5 pixels. The field of view of the medium-resolution image is 360 degrees, and the resolution of the medium-resolution image is one-half of that of the high-resolution image. The super-resolution deep learning network model is a super-resolution generative adversarial network (SRGAN).

An embodiment of the invention provides an electronic device configured to process an image that can be played on a virtual reality device. The electronic device includes a processor configured to execute a super-resolution deep learning network model. The super-resolution deep learning network model is trained to learn to reconstruct an image from low resolution to high resolution. The super-resolution deep learning network model includes a plurality of feature filters to extract features of the image. The resolution of the feature filters is modified from a preset value to an established value, and the established value is higher than the preset value. The processor inputs a low-resolution image into the super-resolution deep learning network model, and increases the resolution of the low-resolution image to become a high-resolution image through the super-resolution deep learning network model.

According to the electronic device disclosed above, the processor decreases the resolution of the high-resolution image to generate a medium-resolution image, and sends the medium-resolution image to the virtual reality device for display through wired or wireless communication.

According to the electronic device disclosed above, the processor executes the training of the super-resolution deep learning network model, including: selecting a training image from an image set; randomly cropping a first sampled image with a resolution of 384*384 pixels from the training image; decreasing the resolution of the first sampled image to 96*96 pixels to obtain a second sampled image; executing the resolution enhancement algorithm in the super-resolution deep learning network model to increase the resolution of the second sampled image back to 384*384 pixels to obtain a virtual image; comparing the virtual image with the first sampled image to calculate the degree of distortion of the virtual image relative to the first sampled image; repeatedly adjusting the feature weight of the resolution enhancement algorithm until the degree of distortion of the virtual image relative to the first sampled image is lower than a threshold; and selecting another training image from the image set and repeating the training.

According to the electronic device disclosed above, the low-resolution image and the training image are images with a 360-degree field of view and 4K resolution, and the high-resolution image is an image with a 360-degree field of view and 16K resolution. The preset value is 3*3 pixels, and the established value is 5*5 pixels. The field of view of the medium-resolution image is 360 degrees, and the resolution of the medium-resolution image is one-half of that of the high-resolution image. The super-resolution deep learning network model is a super-resolution generative adversarial network.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration.

DETAILED DESCRIPTION OF THE INVENTION

Figure 1:
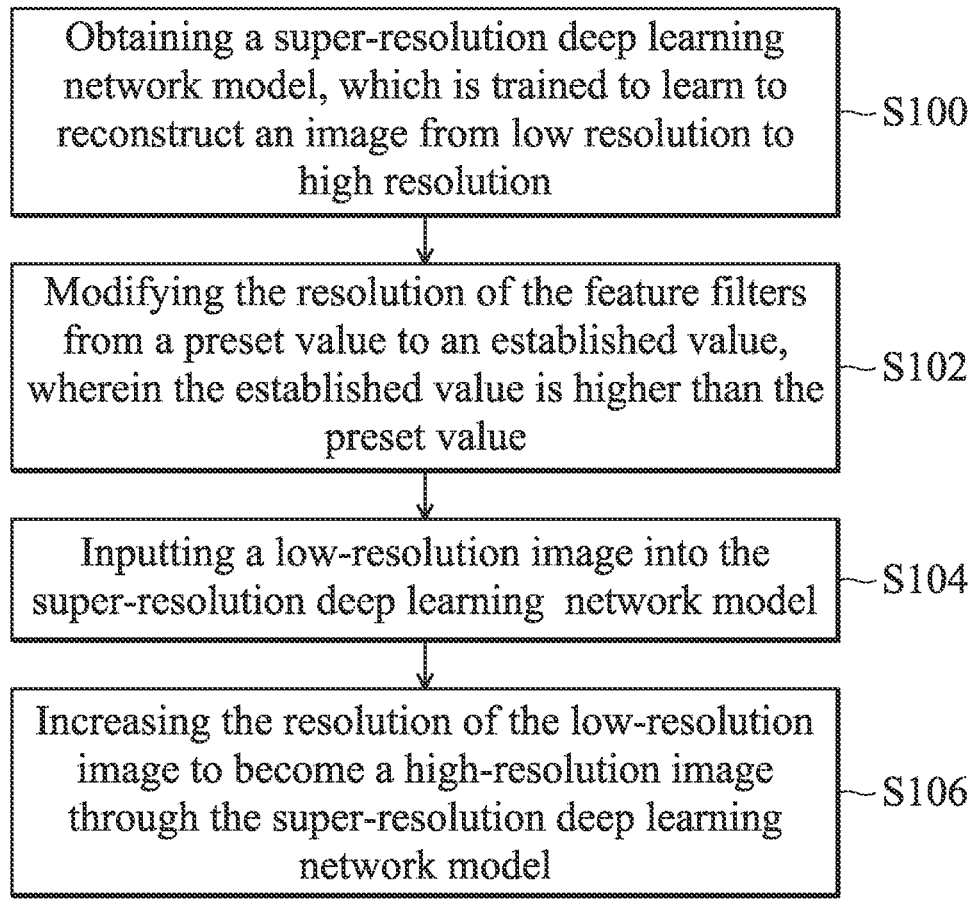
FIG. 1 is a flow chart of a method for processing an image that can be played on a virtual reality device in accordance with some embodiments of the disclosure.

FIG. 1 is a flow chart of a method for processing an image that can be played on a virtual reality device in accordance with some embodiments of the disclosure. As shown in FIG. 1, the processing method of the present invention first obtains a super-resolution deep learning network model (step S100). In some embodiments, the present invention obtains the algorithm of the super-resolution deep learning network model released by Google with reference to an academic paper (URL: https://arxiv.org/abs/1609.04802) from public disclosure. The algorithm is modified, so that the super-resolution deep learning network model can increase the resolution of a low-resolution image into a high-resolution image. In some embodiments, the low-resolution image is an image with a 360-degree field of view and 4K resolution, and the high-resolution image is an image with a 360-degree field of view and 16K resolution.

The super-resolution deep learning network model includes a plurality of feature filters to extract features of the input image. In some embodiments, the super-resolution deep learning network model obtained from public data uses images with a 90-degree field of view and 2K resolution as its training images, and the size of its feature filter is 3*3 pixels. The feature filter of the super-resolution deep learning network model obtained from public data is trained to extract the features of images with a 90-degree field of view and 2K resolution. In order to satisfy the application of the present invention and to improve the resolution of panoramic videos or panoramic images, the present invention uses images with a 360-degree field of view and 4K resolution as the training images of the super-resolution deep learning network model, and adjusts the size of the feature filter of the super-resolution deep learning network model to 5*5 pixels (step S102) to meet the requirements of capturing panoramic videos or panoramic images. For example, assuming that a feature filter with the size of 3*3 pixels is used to capture a first image with a 90-degree field of view and 2K resolution, a complete facial feature in the first image can be captured. However, a feature filter with the size of 3*3 pixels is used to capture a second image with a 360-degree field of view and 4K resolution (the content of the second image is the same as the first image, only the resolution is different), only a part of the facial features can be captured, for example, only the features of individual eyes, nose, or ears can be captured. Therefore, in order to comply with the application of processing panoramic videos or panoramic images of the present invention, the processing method of the present invention adjusts the size of the feature filter to 5*5 pixels, so that the feature filter can, for example, capture the complete facial features.

In some embodiments, the pixel size of the feature filter cannot be unrestrictedly adjusted to extract more features. For example, assuming that the features that the feature filter needs to capture are only the facial features, if the size of the feature filter is increased, for example, adjusted to 10*10 pixels or 15*15 pixels, the feature filter may capture many noises (such as the background or other objects in the background) other than the facial features, so that the ability of the super-resolution deep learning network model to reconstruct images from low resolution to high resolution is compromised.

After the super-resolution deep learning network model has completed training (or learning) by the images with a 360-degree field of view and 4K resolution as the training images, and after the size of the feature filter is adjusted to 5*5 pixels, the processing method of the present invention then inputs a low-resolution image (such as an image with a 360-degree field of view and 4K resolution) into the trained super-resolution deep learning network model (step S104). After that, the processing method of the present increases the resolution of the low-resolution image to become a high-resolution image (for example, an image with a 360-degree field of view and 16K resolution) through the super-resolution deep learning network model (step S106). In some embodiments, the present invention uses the super-resolution deep learning network model to increase the resolution of an image with a 360-degree field of view and 4K resolution to that of an image with a 360-degree field of view and 16K resolution (that is, the resolution is enlarged to 4 times the original). In other words, to use the super-resolution deep learning network model to process images with a 360-degree field of view and 4K resolution, the training images of the super-resolution deep learning network model must also be training images with a 360-degree field of view and 4K resolution, and the size of the feature filter is adjusted appropriately to get the best resolution enhancement effect.

In some embodiments, the processing method of the present invention further decreases the resolution of the high-resolution image to generate a medium-resolution image (for example, an image with a 360-degree field of view and 8K resolution), and inputs the medium-resolution image into the virtual reality device for display. Generally, the display resolution of the existing virtual reality device is 1024*1024 in each of the top, bottom, left, and right (of spherical shapes). Two purposes for the processing method of the present invention to decrease the high-resolution image (for example, an image with a 360-degree field of view and 16K resolution) to the middle-resolution image (for example, an image with a 360-degree field of view and 8K resolution) are disclosed. First, an image with a 360-degree field of view and 8K resolution is input to the virtual reality device, so that a third image with a 90-degree field of view and 2048*1024 pixels resolution is displayed on top, bottom, left and right. Since the resolution of the third image is still greater than the display resolution of the virtual device, when the third image is displayed on the virtual device, the user may still feel clear visually. Second, the noises caused by increasing resolution can be reduced. In the process of upgrading the low-resolution image to the high-resolution image by the super-resolution deep learning network model, the detailed features of the low-resolution mage are captured through feature filters. Then, according to the obtained detailed features, the low-resolution image is reconstructed into the high-resolution image by means of point-filling. During the process described above, noises often exist in non-feature areas (such as the background) of the high-resolution image. Therefore, the processing method of the present invention decreases the resolution of the high-resolution image (for example, an image with a 360-degree field of view and 16K resolution) to that of the middle-resolution image (for example, an image with a 360-degree field of view and 8K resolution), which can achieve a specific technical effect of reducing background noise.

Figure 2:
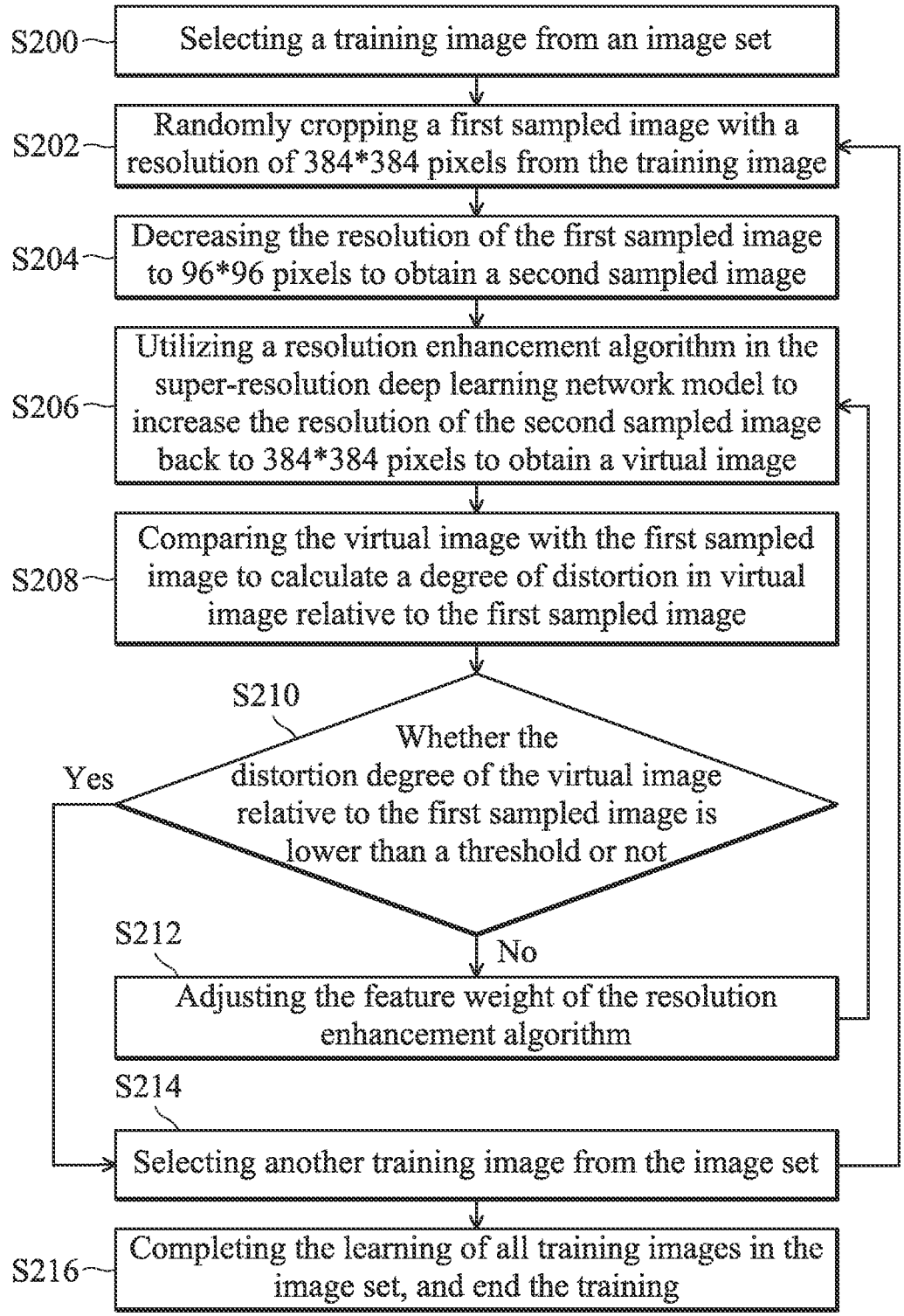
FIG. 2 is a flow chart of a method for training a super-resolution deep learning network model in accordance with some embodiments of the disclosure.

FIG. 2 is a flow chart of a method for training a super-resolution deep learning network model in accordance with some embodiments of the disclosure. As shown in FIG. 2, the training method of the super-resolution deep learning network model of the present invention first selects a training image from an image set (step S200). In some embodiments, if the super-resolution deep learning network model is used to increase the resolution of a vehicle image, the image set must include as much as possible images of various vehicles for the super-resolution deep learning network model to learn the detailed features of the vehicles. In some embodiments, if the super-resolution deep learning network model is used to increase the resolution of a facial image, the image set must include as much as possible images of various faces for the super-resolution deep learning network model to learn the detailed features of the faces. In some embodiments, when the images in the image set include various features (such as human, cats, dogs, cars, etc.), the super-resolution deep learning network model may appropriately adjusts feature weights corresponding to various features during the training (or learning) process. In some embodiments, the images in the image set are images with a 360-degree field of view and 4K resolution.

The training method of the super-resolution deep learning network model of the present invention then randomly crops a first sampled image with a resolution of 384*384 pixels from the training image (step S202). Then, the training method of the present invention decreases the resolution of the first sampled image to 96*96 pixels to obtain a second sampled image (step S204). The purpose of step S202 and step S204 is to reduce the amount of memory space used by the training process of the super-resolution deep learning network model, and to speed up the training. Since the training images are images with a 360-degree field of view and 4K resolution, and have large data size, it is impossible to directly using the original image of the training image for training. After that, the training method of the present invention utilizes the resolution enhancement algorithm in the super-resolution deep learning network model to increase the resolution of the second sampled image back to 384*384 pixels to obtain a virtual image (step S206). The resolution enhancement algorithm records feature weights corresponding to various features of the training images in the image set. For example, assuming that the content of the first sampled image is a car, the resolution enhancement algorithm uses 70% car feature weights, 20% small truck feature weights, and 10% big truck feature weights to reconstruct the second sampled image into the virtual image of 384*384 pixels. In some embodiments, the image set includes images of various cars, small trucks, or big trucks.

The training method of the present invention then compares the virtual image with the first sampled image to calculate the degree of distortion of the virtual image relative to the first sampled image (step S208), and continuously executes step S210. In the step S210, the training method of the super-resolution deep learning network model of the present invention determines whether the degree of distortion of the virtual image relative to the first sampled image is lower than a threshold or not. When the degree of distortion is not lower than the threshold, it means that the difference between the virtual image and the first sampled image is still large, and step S212 needs to be performed to adjust the feature weight of the resolution enhancement algorithm. Continuing the example used in the previous paragraph, when the degree of distortion of the virtual image, which is reconstructed by the resolution enhancement algorithm using 70% car feature weights, 20% small truck feature weights, and 10% big truck feature weights, relative to the first sampled image is still above or at the threshold, at this time, the resolution enhancement algorithm may adjust the feature weight configuration. For example, the resolution enhancement algorithm uses 80% car feature weights, 10% small truck weight, and 10% big truck feature weights to reconstruct the second sampled image back to the virtual image (back to step S206), and continues to compare the degree of distortion in the reconstructed virtual image relative to the first sampled image in step S208. When the degree of distortion is lower than the threshold, that is, the super-resolution deep learning network model determines that the virtual image is very similar to the first sampled image, the training method of the present invention then executes step S214 to select another training image from the image set, and repeats step S202.

In some embodiments, for example, assuming that the content of the first sampled image is a skyscraper. In step S206, the resolution enhancement algorithm of the super-resolution deep learning network model reconstructs the second sampled image with 96*96 pixels to the virtual image with 384*384 pixels by using 60% house feature weights, 20% bridge feature weights, and 10% background feature weights. In step S208, the super-resolution deep learning network model compares and calculates the degree of distortion in the virtual image relative to the first sampled image. In step S210, when the degree of distortion is lower than the threshold, the super-resolution deep learning network model learns to use 60% house feature weights, 20% bridge feature weights, and 10% background feature weights to increase the resolution of the input image having the content of the skyscrapers. On the contrary, when the degree of distortion is still above or at the threshold, the super-resolution deep learning network model may continuously execute step S212. For example, the super-resolution deep learning network model uses 90% house feature weights, 5% bridge feature weights, and 5% background feature weights to increase the resolution of the input image having the content of the skyscrapers to generate another virtual image. When the degree of distortion of another virtual image relative to the first sampled image is lower than the threshold, the super-resolution deep learning network model may use the newly adjusted feature weight setting to increase the resolution of the input image having the content of the skyscrapers.

In other words, the training method of the present invention may repeatedly adjust the feature weight of the resolution enhancement algorithm (step S212) until the degree of distortion of the obtained virtual image relative to the first sampled image is lower than the threshold (that is, "Yes" in step S210). When the learning of all training images in the image set is completed, the training method of the super-resolution deep learning network model of the present invention has completed, and the training is then ended (step S216). In some embodiments, according to the public disclosure, the super-resolution deep learning network model uses an image with a 90-degree field of view and 2K resolution as a training image in the image set. At this time, the pixel per degree (PPD) of the training image of the super-resolution deep learning network model is equal to "5.7" ((96*2048)/(90*384)=5.7). The application of the present invention is to use an image with a 360-degree field of view and 4K resolution as the training image in the image set. At this time, the pixel per degree (PPD) of the training image of the super-resolution deep learning network model is equal to "2.8" ((96*4096)/(360*384)=2.8). In other words, the PPD (2.8) of the training image of the super-resolution deep learning network model in the present invention is very closed to the PDD (5.7) of the training image of the super-resolution deep learning network model in the public disclosure. Therefore, the super-resolution deep learning network model modified and trained by the processing method of the present invention can increase the resolution of a panoramic video or a panoramic image with a 360-degree field of view to 4 times the original resolution, and can maintain the sharpness of the panoramic video or the panoramic image.

In some embodiments, the super-resolution deep learning network model is a super-resolution generative adversarial network (SRGAN). The super-resolution generative adversarial network includes a generator network, and a discriminator network. The generator network executes step S206 and step S212 of the training method of the super-resolution deep learning network model of the present invention. In other words, the generator network includes the resolution enhancement algorithm to increase the resolution of the second sampled image back to 384*384 pixels to obtain the virtual image. Further, when the degree of distortion in the virtual image relative to the first sampled image is above or at the threshold, the generator network may adjust the feature weight configuration of the resolution enhancement algorithm, and regenerates the virtual image with the new feature weight configuration. The discriminator network executes step S210 of the training method of the super-resolution deep learning network model of the present invention, to compare the difference between the virtual image generated by the generator network and the first sampled image, and to calculate the degree of distortion in the virtual image relative to the first sampled image.

In some embodiments, the super-resolution generative adversarial network has data structures of total 19 layers. The first layer is an input layer to receive an input image. The second to seventeenth layers are convolution calculation layers, which may capture the features of the input image and normalize the captured features of the input image. The eighteenth and nineteenth layers are the resolution enhancement layers, which are used to increase the resolution of the input image in a way of complementing points according to the normalized features of the input image and the learned feature weights. Each of the second to seventeenth layers has a convolution layer and a normalization layer. The convolution layer performs a convolution calculation with the input image through the feature filter of the super-resolution generative adversarial network to extract the features of the input image. The normalization layer normalizes the captured features of the input image. For example, the normalization layer may include an S (Sigmoid) function to normalize the features of the input image to facilitate subsequent calculation of the $18^{th}$ and $19^{th}$ layers of the resolution enhancement layer. In other words, the $18^{th}$ and $19^{th}$ layers of the resolution enhancement layer execute step S106 in FIG. 1 and step S206 in FIG. 2.

The present invention also discloses an electronic device to process images that can be played on a virtual reality device. The electronic device (for example, a laptop, a desktop, a server, or mobile device, etc.) includes a processor to execute a super-resolution deep learning network model. In some embodiments, the super-resolution deep learning network model is a super-resolution generative adversarial network. When the processor executes the super-resolution deep learning network model, the processor executes step S100, step S102, step S104, and step S106 in FIG. 1 to increase the resolution of a low-resolution image to become a high-resolution image. In addition, the processor of the electronic device further decreases the resolution of the high-resolution image to generate a medium-resolution image, to reduce background noises generated in the process of increasing the resolution. The processor of the electronic device further sends the medium-resolution image to the virtual reality device for display through wired or wireless communication.

The training of the super-resolution deep learning network model stored in the electronic device of the present invention is performed by the processor to execute step S200, step S202, step S204, step S206, and step S210 in FIG. 2. Moreover, in step S210, when the degree of distortion in the virtual image generated by the resolution enhancement algorithm of the super-resolution deep learning network model relative to the first sampled image randomly cropped from a training image is not lower than the threshold, the processor continuously executes step S212, and repeatedly executes step S206, step S208, and step S210 until the degree of distortion calculated in step S210 is lower than the threshold. When the degree of distortion in the virtual image relative to the first sampled image is lower than the threshold, the processor continuously executes step S214, and repeatedly executes step S202 and the subsequent steps until the super-resolution deep learning network completes the learning of all training images (step S216).

According to the method and the electronic device for processing images that can be played in a virtual reality device of the present invention, the problems of the images (which is finally place in the virtual reality device) such as inconsistency of the vertical lines of the images, unclear image color (that is, the image has high degree restoration) are resolved by the super-resolution deep learning network model that is adjusted and trained by the present invention. The super-resolution deep learning network model that is adjusted and trained by the present invention reduces probability of occurrence of error points in the image, and increases sharpness of the image by 6%, so that users may see high-resolution panoramic videos and panoramic images with a 360-degree field of view in the virtual reality device.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. A method for processing an image that can be played on a virtual reality (VR) device, comprising:
   obtaining a super-resolution deep learning network model, which is trained to learn to reconstruct an image from low resolution to high resolution; wherein the super-resolution deep learning network model comprises a plurality of feature filters to extract features of the image;
   modifying the resolution of the feature filters from a preset value to an established value, wherein the established value is higher than the preset value;
   inputting a low-resolution image into the super-resolution deep learning network model; and
   increasing the resolution of the low-resolution image to become a high-resolution image through the super-resolution deep learning network model;
   wherein the training of the super-resolution deep learning network model comprises:
   selecting a training image from an image set;
   randomly cropping a first sampled image with a resolution of 384*384 pixels from the training image;
   decreasing the resolution of the first sampled image to 96*96 pixels to obtain a second sampled image;
   utilizing a resolution enhancement algorithm in the super-resolution deep learning network model to increase the resolution of the second sampled image back to 384*384 pixels to obtain a virtual image;
   comparing the virtual image with the first sampled image to calculate a degree of distortion in the virtual image relative to the first sampled image;
   repeatedly adjusting the feature weight of the resolution enhancement algorithm until the degree of distortion in the virtual image relative to the first sampled image is lower than a threshold; and
   selecting another training image from the image set and repeating the training.

2. The method as claimed in claim 1, further comprising:
   decreasing the resolution of the high-resolution image to generate a medium-resolution image;
   inputting the medium-resolution image into the virtual reality device for display.

3. The method as claimed in claim 2, wherein the field of view of the medium-resolution image is 360 degrees, and the resolution of the medium-resolution image is one-half of that of the high-resolution image.

4. The method as claimed in claim 1, wherein the low-resolution image and the training image are images with a 360-degree field of view and 4K resolution, and the high-resolution image is an image with a 360-degree field of view and 16K resolution.

5. The method as claimed in claim 1, wherein the preset value is 3*3 pixels, and the established value is 5*5 pixels.

6. The method as claimed in claim 1, wherein the super-resolution deep learning network model is a super-resolution generative adversarial network (SRGAN).

7. An electronic device, configured to process an image that can be played on a virtual reality device, comprising:
   a processor, configured to execute a super-resolution deep learning network model, wherein the super-resolution deep learning network model is trained to learn to reconstruct an image from low resolution to high resolution, the super-resolution deep learning network model comprises a plurality of feature filters to extract features of the image, the resolution of the feature filters is modified from a preset value to an established value, and the established value is higher than the preset value;
   wherein the processor inputs a low-resolution image into the super-resolution deep learning network model, and increases the resolution of the low-resolution image to become a high-resolution image through the super-resolution deep learning network model;
   wherein the processor executes the training of the super-resolution deep learning network model, comprising:
   selecting a training image from an image set;
   randomly cropping a first sampled image with a resolution of 384*384 pixels from the training image;
   decreasing the resolution of the first sampled image to 96*96 pixels to obtain a second sampled image;
   executing the resolution enhancement algorithm in the super-resolution deep learning network model to increase the resolution of the second sampled image back to 384*384 pixels to obtain a virtual image;
   comparing the virtual image with the first sampled image to calculate the distortion degree of the virtual image relative to the first sampled image;
   repeatedly adjusting the feature weight of the resolution enhancement algorithm until the distortion degree of the virtual image relative to the first sampled image is lower than a threshold; and
   selecting another training image from the image set and repeating the training.

8. The electronic device as claimed in claim 7, wherein the processor decreases the resolution of the high-resolution image to generate a medium-resolution image, and sends the medium-resolution image to the virtual reality device for display through wired or wireless communication.

9. The electronic device as claimed in claim 8, wherein the field of view of the medium-resolution image is 360 degrees, and the resolution of the medium-resolution image is one-half of that of the high-resolution image.

10. The electronic device as claimed in claim 7, wherein the low-resolution image and the training image are images with a 360-degree field of view and 4K resolution, and the high-resolution image is an image with a 360-degree field of view and 16K resolution.

11. The electronic device as claimed in claim 7, wherein the preset value is 3*3 pixels, and the established value is 5*5 pixels.

12. The electronic device as claimed in claim 11, wherein the super-resolution deep learning network model is a super-resolution generative adversarial network.

* * * * *